(12) United States Patent
Scharnberg et al.

(10) Patent No.: US 12,280,733 B2
(45) Date of Patent: Apr. 22, 2025

(54) TENSIONING DEVICE

(71) Applicant: Autoliv Development AB, Vargarda (SE)

(72) Inventors: Ole Scharnberg, Hamburg (DE); Thomas Gasthaus, Hamburg (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 18/160,681

(22) Filed: Jan. 27, 2023

(65) Prior Publication Data

US 2023/0242064 A1 Aug. 3, 2023

(30) Foreign Application Priority Data

Feb. 3, 2022 (DE) .......................... 102022102565.9

(51) Int. Cl.
*B60R 22/195* (2006.01)
*F15B 15/12* (2006.01)

(52) U.S. Cl.
CPC ...... *B60R 22/1954* (2013.01); *B60R 22/1952* (2013.01); *F15B 15/125* (2013.01)

(58) Field of Classification Search
CPC ............. B60R 22/195; B60R 22/1952; B60R 22/1954; B60R 22/46; B60R 22/4619; B60R 22/4628
See application file for complete search history.

(56) References Cited

U.S. PATENT DOCUMENTS

| 5,468,019 A * | 11/1995 | Blase ................ B60R 22/4619 297/480 |
| 6,345,504 B1 | 2/2002 | Takehara et al. |
| 7,744,126 B2 * | 6/2010 | Durrer ................ F15B 15/19 297/479 |
| 9,050,941 B2 | 6/2015 | Fischer et al. |
| 2008/0277520 A1* | 11/2008 | Durrer ................ F15B 15/125 242/410 |

(Continued)

FOREIGN PATENT DOCUMENTS

| CN | 116533921 A * | 8/2023 | ......... B60R 22/1952 |
| DE | 29604482 U1 | 5/1996 | |

(Continued)

OTHER PUBLICATIONS

Machine translation of DE102005049659B3 (Retrieved from Internet Dec. 6, 2023). (Year: 2023).*

*Primary Examiner* — Drew J Brown
(74) *Attorney, Agent, or Firm* — DICKINSON WRIGHT PLLC

(57) ABSTRACT

The present invention relates to a tensioning device for a seat belt device, with a gas generator (10) for generating a pressurized gas, a piston (2) that can be driven by the pressurized gas, a tension cable (5) connected to the piston (2), which tension cable can be connected to a safety belt component that is to be set into a tensioning movement and which tension cable extends through the piston (2), a guide part (3) arranged on the tension cable (2), and a tensioning tube (6) for receiving the piston (2) and the guide part (3), which is characterized in that the guide part (3) is arranged on the side of the piston (2) facing away from the gas generator (10) and is movable relative to the piston (2).

16 Claims, 2 Drawing Sheets

(56) References Cited

U.S. PATENT DOCUMENTS

| | | | |
|---|---|---|---|
| 2012/0211578 A1 | 8/2012 | Fischer et al. | |
| 2014/0265517 A1* | 9/2014 | Betz | B60R 22/1954 297/475 |
| 2015/0028652 A1* | 1/2015 | Betz | B60R 22/195 297/480 |
| 2021/0213907 A1* | 7/2021 | Krauss | B60R 22/1952 |
| 2023/0242068 A1* | 8/2023 | Gasthaus | B60R 22/4633 242/390.5 |

FOREIGN PATENT DOCUMENTS

| | | | | |
|---|---|---|---|---|
| DE | 102005015682 A1 * | 10/2006 | ......... | B60R 22/4619 |
| DE | 102005050426 B3 * | 3/2007 | ......... | B60R 22/1952 |
| DE | 102005049659 B3 | 4/2007 | | |
| DE | 102007046715 B3 | 2/2009 | | |
| DE | 102007046726 B3 * | 2/2009 | ......... | B60R 22/1952 |
| DE | 10 2009 051 451 A1 | 5/2011 | | |
| DE | 102012204810 B3 * | 5/2013 | ......... | B60R 22/1952 |
| DE | 10 2012 214 936 A1 | 2/2014 | | |
| DE | 102015010788 A1 * | 2/2017 | | |
| DE | 102018128032 A1 * | 5/2020 | | |
| DE | 102020207374 A1 * | 12/2021 | | |
| DE | 102020122985 A1 * | 3/2022 | | |
| DE | 102021125766 A1 * | 4/2023 | ......... | B60R 22/4628 |
| DE | 102021211862 A1 * | 4/2023 | ......... | B60R 22/1952 |
| FR | 2910941 A1 * | 7/2008 | ............. | F15B 15/19 |
| WO | 2011/134574 A1 | 11/2011 | | |

* cited by examiner

TENSIONING DEVICE

CROSS-REFERENCE TO RELATED APPLICATIONS

This application claims the benefit of priority under 35 U.S.C. § 119 to German Patent Application No. 10 2022 102 565.9, filed Feb. 3, 2022, the contents of which are incorporated herein by reference in its entirety.

FIELD OF THE INVENTION

The present invention relates to a tensioning device, in particular for a seat belt device, wherein the tensioning device comprises a gas generator for generating a pressurized gas, a piston that can be driven by the pressurized gas, a tension cable that is connected to the piston, which tension cable is connectable to a component to be set into a tensioning movement and which tension cable extends through the piston, a guide part arranged on the tensioning cable and a tensioning tube for receiving the piston and the guide part.

BACKGROUND

A tensioning device with the aforementioned features is known from DE 10 2005 049 659 B3. Thereby, the piston is formed to be olive-shaped and a separate guide part is arranged on the side of the piston facing the gas generator. Since the olive-shaped piston and the guide part are formed as separate components, they must each be threaded individually onto the guide cable during assembly. It has also been shown that a piston with a flat outer circumferential surface in contact with the inner surface of the tensioning tube can be driven more reliably by means of the pressurized gas than an olive-shaped piston.

Therefore, it is the object of the present invention to eliminate the disadvantages described with reference to the prior art and, in particular, to provide a tensioning device and a one-piece piston assembly unit for a tensioning device, with which the assembly of the tensioning device is simplified and with which a reliable drive of the piston is possible.

The object is achieved by a tensioning device and a piston assembly unit with the features described herein. Advantageous developments of the tensioning device and of the piston assembly unit are specified in the description, wherein individual features of the advantageous developments can be combined with one another in a technically expedient manner.

SUMMARY

The object is achieved in particular by a tensioning device with the features mentioned at the beginning, with which the guide part is arranged on the side of the piston facing away from the gas generator and is movable relative to the piston.

In other words: The basic idea of the invention is that the guide part, which is not absolutely gas-tight against the inner wall of the tensioning tube and which hardly transmits any forces to the tension cable during the actual tensioning process, is arranged, in the event that it is triggered, on the side of the piston opposite the pressurized gas, as a result of which the piston is aligned during the tensioning process as it passes through a curvature in the tube. This in turn makes the tensioning process more uniform. The piston, on the other hand, which is almost gas-tight with its radial circumference at least linearly and preferably flat against the inner side of the tensioning tube, is acted upon directly by the pressurized gas and thus driven uniformly. Thus, the tensioning device preferably comprises a tensioning tube that is curved at least in sections, wherein the piston passes through the curvature of the tensioning tube during the tensioning process.

To simplify assembly, a one-piece piston assembly unit for a tensioning device is also proposed which comprises a piston and a guide part, wherein a predetermined breaking point is formed between the piston and the guide part. Such a piston assembly unit has, in particular, a centrally arranged channel for receiving the tension cable. The one-piece piston assembly unit can be slid onto the tension cable during assembly, and only one component needs to be assembled due to the one-piece design of the piston and the guide part. The predetermined breaking point, formed for example by a material taper or other suitable measures, is dimensioned such that the piston can be separated from the guide part during assembly. Preferably, the separation occurs during assembly if the piston assembly unit is inserted into the tensioning tube and the guide part already reaches a curvature in the tensioning tube while the piston is still arranged in a straight section of the guide tube (or vice versa). The predetermined breaking point is preferably formed in such a manner that a distinct noise is generated when the piston is separated from the guide part at the predetermined breaking point. Thus, the piston and the guide part can be assembled together, wherein the mobility between the piston and the guide part required for optimum guidance is only established during assembly.

Accordingly, the guide part and the piston are separated by a broken predetermined breaking point when the tensioning device is assembled.

To protect the tension cable from the high temperatures of the pressurized gas, particularly at the start of the tensioning process, it is proposed that the piston be formed in one piece with a protective tube section, wherein the protective tube section surrounds the tension cable on the side of the piston facing the gas generator. Accordingly, it is proposed that the one-piece piston assembly unit forms a protective tube section on the side of the piston facing away from the guide part. Thus, the protective tube section surrounds the tension cable in a region in which the tension cable would be exposed to hot pressurized gas. Accordingly, the diameter of the tension cable can also be smaller, since it does not need to be designed for the maximum temperatures of the pressurized gas.

In order for the protective tube section to be able to follow the curvature of the tensioning tube during the tensioning process, it is proposed that the protective tube section be designed to be bendable, wherein it can be provided in particular that such ability to bend is due to a material weakening in the protective tube section. For example, the protective tube section can have circumferentially extending indentations arranged in series in the longitudinal direction of the protective tube section, such that the protective tube section can be curved.

The one-piece piston assembly unit and thus also the piston, the guide part and the protective tube section are preferably formed from POM plastic.

To form the guide part, it can be provided in particular that the diameter of the guide part widens from its end facing away from the piston towards the piston, such that the guide part aligns itself in the tensioning tube and in particular in a curvature of the tensioning tube during the tensioning process, as a result of which the tension cable and thus the following piston are also aligned. In a preferred embodiment, the guide part is formed to be olive-shaped and has a radius in the longitudinal direction of the tensioning tube that is larger than the effective radius in the transverse direction of the tensioning tube, as a result of which a particularly good alignment of the guide part in the tensioning tube takes place during the tensioning process. The piston, on the other hand, is preferably annular on its outer circumference.

For greater freedom in the design of the tensioning device with respect to the orientation of the tensioning device relative to a unit of a seat belt device such as a belt retractor, it is proposed in one embodiment that the tensioning device comprises a particularly separate and preferably one-piece fastening part, wherein the fastening part serves to attach the tensioning device to the further component (for example, a belt retractor) of the seat belt device and wherein the tension cable is led out of the tensioning device through the fastening part. The fastening part provides a component that can be designed independently of the tensioning tube, such that the function of the tensioning tube for guiding the piston can be separated from the function of attaching the tensioning device to the other component of the seat belt device.

In one embodiment, it can be provided that the fastening part has a gas generator receptacle for the gas generator and a fastening section for attachment to the seat belt component or other component of a seat belt device.

In particular, the fastening part is formed in such a manner that, after the gas generator has been triggered, the generated pressurized gas is conducted through the fastening part into the tensioning tube, while at the same time ensuring that the tension cable is led out of the tensioning tube through the fastening part. For this purpose, for example, a channel leading from the receptacle for the gas generator can be formed through which the pressurized gas can flow into the tensioning tube.

In the assembled state, the protective tube section is thereby arranged on a section of the tension cable onto which the pressurized gas from the gas generator receptacle passes. In particular, in the initial state, the protective tube section is arranged inside the fastening part.

The tensioning device according to the invention is used in particular in a seat belt device comprising a belt retractor with a shaft for winding up a belt, wherein the tension cable is connected to the shaft and the tensioning device is attached to the belt retractor.

BRIEF DESCRIPTION OF THE DRAWINGS

The invention and the technical environment are explained below by way of example with reference to the figures. The following are shown schematically.

Figure 1:
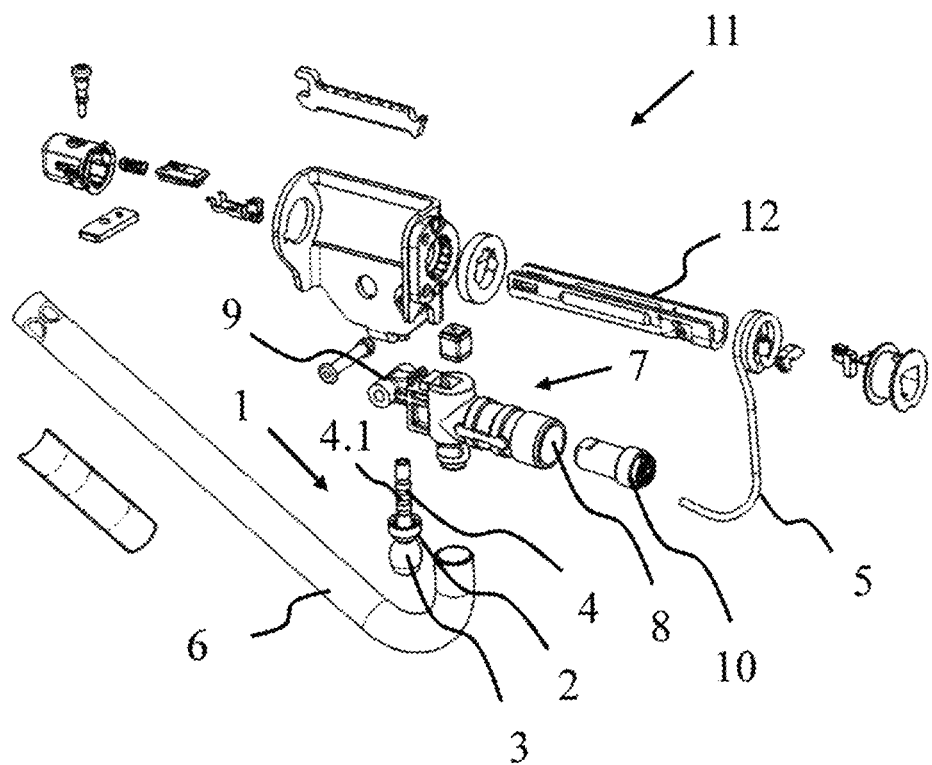
FIG. 1: an exploded view of a seat belt device with a tensioning device and a belt retractor.

The seat belt device shown in FIG. 1 comprises a belt retractor 11 with a shaft 12 for winding up a belt (not shown). An end fitting or belt buckle can be fastened to the free end of the belt (also not shown).

DETAILED DESCRIPTION

The seat belt device also comprises a tensioning device having a tensioning tube 6, a piston assembly unit 1 and a fastening part 7, in which a gas generator receptacle 8 is formed for receiving a gas generator 10. The fastening part 7 also comprises a fastening section 9, which can be used to fasten the fastening part 7, and thus the tensioning tube 6 attached to the fastening part 7, to the belt retractor 11.

Figure 2:
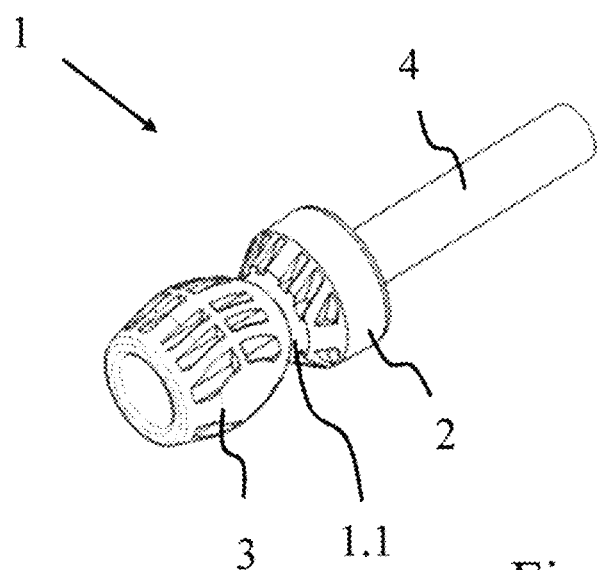
FIG. 2: a one-piece piston assembly unit prior to assembly with a predetermined breaking point
Figure 3:
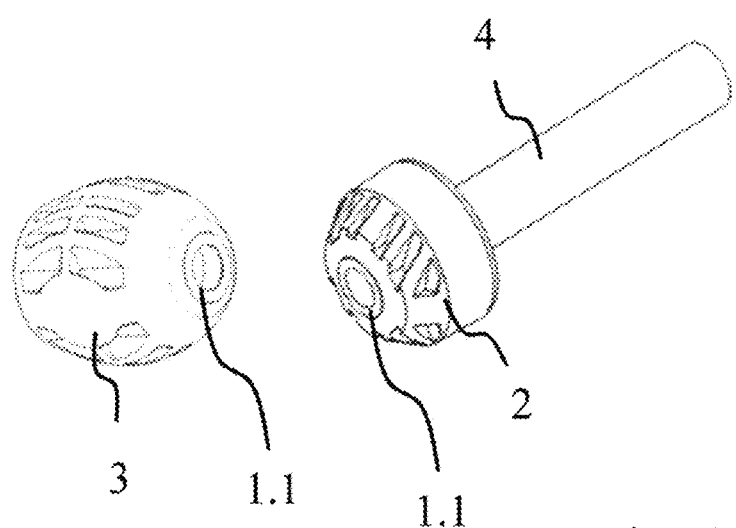
FIG. 3: the piston assembly unit in the broken state.

Prior to assembly, the piston assembly unit 1 is made in one piece and comprises a piston 2, a guide part 3 and a protective tube section 4 (see also FIGS. 2 and 3). A predetermined breaking point 1.1 is formed between the piston 2 and the guide part 3. The predetermined breaking point 1.1 is formed such that the guide part 3 breaks from the piston 2 during assembly and in particular during its insertion into a curved section of the tensioning tube 6. The piston assembly unit is shown in the broken state in FIG. 3.

In the assembled state, the tension cable 5 is wound onto the shaft 12, on the one hand, and, on the other hand, is guided through the fastening part 7 and through the protective tube section 4, through the guide part 3 and the piston 2. Thereby, in the initial state, the protective tube section 4 is arranged in the fastening part 7.

The tensioning process is started by triggering the gas generator 10, wherein the hot pressurized gas generated by the gas generator 10 initially acts on the protective tube section 4 surrounding the tension cable 5, such that the tension cable 5 is protected from the hot pressurized gas. The pressurized gas then drives the piston 3 through the tensioning tube 6. Due to the broken predetermined breaking point 1.1, the guide part 3 is movable relative to the piston 2, such that the guide part 3, which is coupled to the piston 3 via the tension cable 5, aligns the piston 2 as it passes through the curved section of the tensioning tube 6.

So that the protective tube section 4 can also follow the curvature of the tensioning tube 6, the protective tube section 4 has material weakenings 4.1, such that the protective tube section 4 can be bent in the curved region of the tensioning tube 6. During the tensioning process, the tension cable 5 is pulled into the tensioning tube 6 by the piston 2, as a result of which the tension cable 5 is unwound from the shaft 12, which in turn winds up the belt.

The invention claimed is:

1. A tensioning device, comprising;
   a gas generator for generating a pressurized gas,
   a piston that can be driven by the pressurized gas,
   a tension cable connected to the piston, wherein the tension cable can be connected to a component that is to be set into a tensioning movement and wherein the tension cable extends through the piston,
   a guide part arranged on the tension cable on a side of the piston facing away from the gas generator,
   a tensioning tube for receiving the piston and the guide part, the tensioning tube having a section forming a curvature, and
   further comprising, wherein the guide part and the piston are initially a one piece assembly separated from one another by a predetermined breaking point and wherein the piston and the guide part become detached at the predetermined breaking point upon insertion of the piston and the guide part into the tensioning tube past the section forming a curvature, whereupon the guide part is moveable relative to the piston.

2. The tensioning device according to claim 1, wherein the piston is formed in one piece with a protective tube section, wherein the protective tube section surrounds the tension cable on a side of piston facing the gas generator.

3. The tensioning device according to claim 2, wherein the protective tube section is bendable.

4. The tensioning device according to claim 3, wherein the ability to bend the protective tube section is due to material weakenings in the protective tube section.

5. The tensioning device according to claim 1, wherein the guide part is formed to be olive-shaped and has a radius in a longitudinal direction of the tensioning tube that is larger than an effective radius in the transverse direction of the tensioning tube.

6. The tensioning device according to claim 1, which comprises a fastening part, wherein the fastening part serves to attach the tensioning device to a component of a seat belt device and wherein the tension cable is led out of the tensioning tube through the fastening part.

7. The tensioning device according to claim 6, wherein the fastening part has a gas generator receptacle for the gas generator and a fastening section for attachment.

8. A seat belt device, comprising a belt retractor having a shaft for winding up a belt and comprising a tensioning device according to claim 1, wherein the tension cable is connected to the shaft and the tensioning device is attached to the belt retractor.

9. The piston assembly unit according to claim 1, wherein a protective tube section is formed on the side of the piston facing away from the guide part.

10. A method for assembling a tensioning device, comprising the steps of,
providing a gas generator for generating a pressurized gas,
providing a piston that can be driven by the pressurized gas,
providing a tension cable connected to the piston, wherein the tension cable can be connected to a component that is to be set into a tensioning movement and wherein the tension cable extends through the piston,
providing a guide part arranged on the tension cable on a side of the piston facing away from the gas generator,
providing a tensioning tube for receiving the piston and the guide part, the tensioning tube having a section forming a curvature, and
wherein the guide part and the piston are provided initially as a one piece assembly separated from one another by a predetermined breaking point, and
inserting the piston and the guide part into the tensioning tube past the section forming a curvature, whereupon the piston and the guide part become detached at the predetermined breaking point and the guide part becomes moveable relative to the piston.

11. The method for assembling a tensioning device according to claim 10, wherein providing the piston formed in one piece with a protective tube section, wherein the protective tube section surrounds the tension cable on a side of piston facing the gas generator.

12. The method for assembling a tensioning device according to claim 11, wherein providing the protective tube section as bendable.

13. The method for assembling a tensioning device according to claim 12, wherein the ability to bend the protective tube section is due to material weakenings in the protective tube section.

14. The method for assembling a tensioning device according to claim 11, wherein providing the guide part formed to be olive-shaped and having a radius in a longitudinal direction of the tensioning tube that is larger than an effective radius in the transverse direction of the tensioning tube.

15. The method for assembling a tensioning device according to claim 11, which further comprises providing a fastening part, wherein the fastening part serves to attach the tensioning device to a component of a seat belt device and wherein the tension cable is led out of the tensioning tube through the fastening part.

16. The method for assembling a tensioning device according to claim 15, wherein providing the fastening part having a gas generator receptacle for the gas generator and a fastening section for attachment.

* * * * *